United States Patent [19]

Ogawa et al.

[11] Patent Number: 4,733,314
[45] Date of Patent: Mar. 22, 1988

[54] DISC UNIT INCLUDING AUTOMATIC EJECTION UPON MISINSERTION DETECTION

[75] Inventors: Tetsu Ogawa, Hanazono; Masahiro Kato, Chichibu, both of Japan

[73] Assignee: Canon Denshi Kabushiki Kaisha, Chichibu, Japan

[21] Appl. No.: 540,873

[22] Filed: Oct. 11, 1983

[30] Foreign Application Priority Data

Oct. 14, 1982 [JP] Japan ................ 57-179123
Nov. 12, 1982 [JP] Japan ................ 57-197549

[51] Int. Cl.⁴ .............. G11B 17/04; G11B 17/03; G11B 19/04; G11B 19/10
[52] U.S. Cl. .................... 360/97; 360/71; 360/99; 369/77.2; 369/261; 369/262
[58] Field of Search ........... 360/137, 133, 97, 99, 360/74.6, 86, 69, 71; 250/561, 570, 571; 369/77.1, 77.2, 258, 261, 262

[56] References Cited

U.S. PATENT DOCUMENTS

| | | | |
|---|---|---|---|
| 3,966,330 | 6/1976 | Ridler et al. ............ | 356/386 |
| 4,040,107 | 8/1977 | Bryer .................... | 360/99 |
| 4,168,835 | 9/1979 | Omiya et al. ............ | 274/9 B |
| 4,413,291 | 11/1983 | Ueki et al. ............. | 360/71 |
| 4,620,249 | 10/1986 | Suzaki et al. ........... | 360/99 |

FOREIGN PATENT DOCUMENTS

| | | | |
|---|---|---|---|
| 56-90466 | 7/1981 | Japan ..... | 369/258 |
| 57-71551 | 5/1982 | Japan ..... | 369/77.1 |
| 57-212659 | 12/1982 | Japan ..... | 360/99 |

OTHER PUBLICATIONS

Yanker, "Diskette Orientation Detector and Ejector", IBM Tech. Disc. Bull., vol. 23, No. 7A, Dec. 1980.
Olson, "Circuitry for Testing the Translatory Movement of a Magnetic Diskette into a Disk Drive", IBM Tech. Disc. Bull., vol. 21, No. 11, Apr. 1979.
Russell et al., "Index Amplifier Control for Detecting Diskette in Disk Drive", IBM Tech. Disc. Bull., vol. 22, No. 1, Jun. 1979.

*Primary Examiner*—Stuart N. Hecker
*Assistant Examiner*—Benjamin E. Urcia
*Attorney, Agent, or Firm*—Spencer & Frank

[57] ABSTRACT

A disc unit in which a disc which is inserted into the data storage disc unit in a wrong direction or upside down is automatically discharged from the disc unit. Such a wrong insertion of the disc is detected in response to an index signal generated every time the disc makes one rotation or by detecting an aperture of a disc cassette in which the disc is accommodated.

6 Claims, 10 Drawing Figures

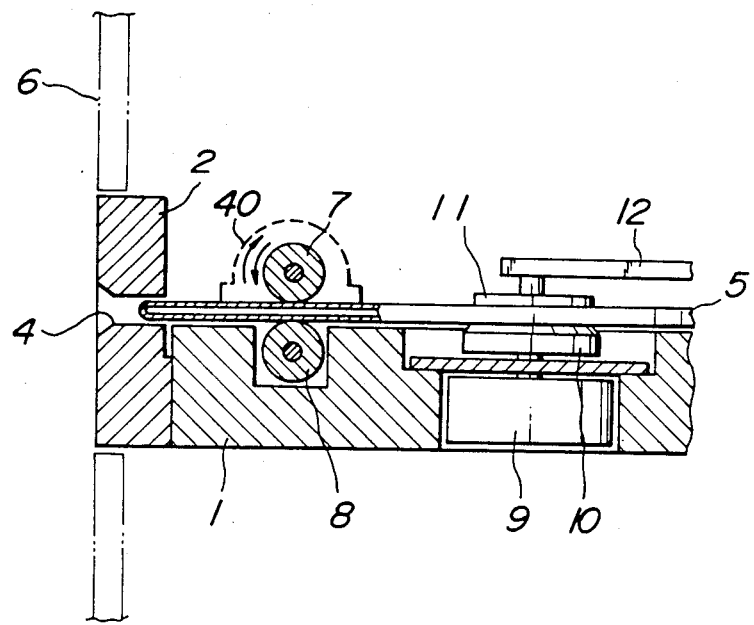
FIG_1

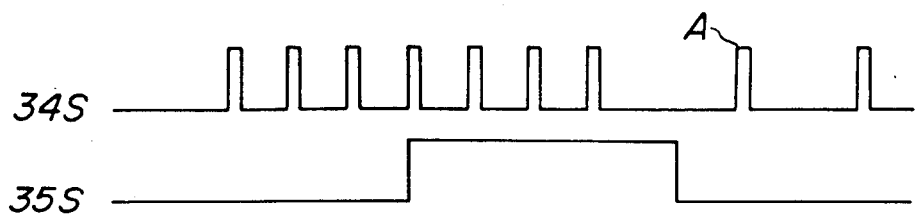
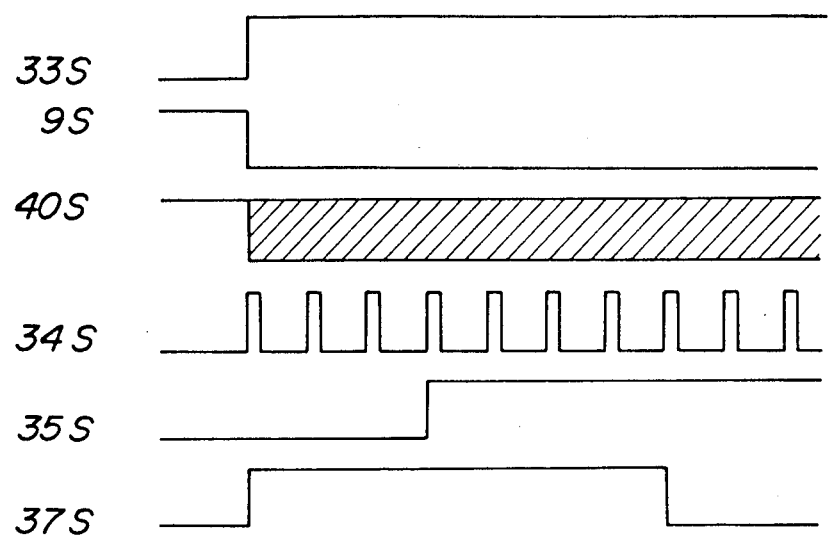
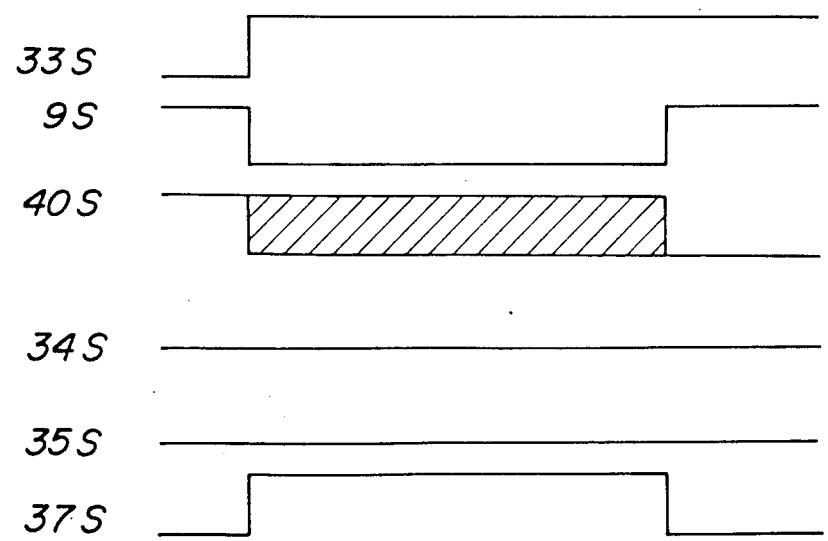

DISC UNIT INCLUDING AUTOMATIC EJECTION UPON MISINSERTION DETECTION

BACKGROUND OF THE INVENTION

1. Field of the Invention

The present invention relates to a data storage disc unit and more particularly to a magnetic disc unit in which information is recorded or reproduced by making a magnetic head slidably contact the surfaces of a magnetic disc used as a magnetic recording medium.

2. Description of the Prior Art

In a magnetic disc unit of the type described, a magnetic disc is inserted or loaded into the magnetic disc unit in such a way that the upper surface of the magnetic disc faces upward, while the lower surface thereof faces downward. When the magnetic disc is inserted or loaded into the magnetic disc unit, it is automatically transported or displaced to its operative position by an automatic loading mechanism and then is securely clamped in position. Thereafter, a magnetic head slidably contacts the surfaces of the magnetic disc, so that information is recorded on or reproduced from the magnetic disc. However, if an operator erroneously inserts or loads a magnetic disc cassette in a wrong direction or upside down (which is referred to as "wrong insertion" in this specification), no recording or reproduction can be effected. Further, in this specification, the term "correct insertion" is used when the magnetic disc is correctly inserted.

The conventional magnetic disc unit of the type described, however, is not provided with means for detecting and alarming or otherwise indicating the wrong insertion of a magnetic disc. Therefore, in the case that no recording or reproduction can be effected, it may take some time until an operator notices that such a failure of recording or reproducing is caused by an erroneous insertion of a magnetic disc into a magnetic disc unit. Alternatively, the operator may misunderstand that the magnetic disc unit is out of order. Furthermore, the time elapsed until the wrong insertion is detected is wasted. When such wrong insertion is detected, one must operate the magnetic disc unit to discharge the inserted or loaded magnetic disc from the magnetic disc unit and then correctly insert or load the discharged magnetic disc. As clear from the above, the conventional magnetic disc unit of the type described above has a disadvantage in that its operability is not satisfactory.

SUMMARY OF THE INVENTION

With the above in view, one of the objects of the present invention is, therefore, to provide a data storage disc unit which has a good operability with simple and inexpensive construction in such a way that the wrong insertion of a disc is automatically detected so that the disc is correctly inserted again.

To the above and other ends, the present invention provides a recording and reproducing apparatus into which a flat recording medium is inserted with predetermined position and direction, so that information is recorded on or reproduced from the flat recording medium, and which comprises wrong insertion detecting means for detecting whether the flat recording medium is inserted into the recording and reproducing apparatus in a wrong direction or upside down, and recording medium discharging means responsive to the output from the wrong insertion detecting means for discharging the erroneously inserted flat recording medium from the recording and reproducing apparatus.

Here, it is preferable that the recording medium discharging means comprises a motor drive circuit, a motor which is driven by the motor drive circuit, and a roller member driven by the motor to transfer the flat recording medium inserted into the recording and reproducing apparatus in such a way that the flat recording medium is discharged from the recording and reproducing apparatus.

According to a second aspect of the present invention, a magnetic disc unit into which a magnetic disc is inserted in such a way that a predetermined surface of the magnetic disc is upward and the sides of the magnetic disc are positioned in predetermined directions, so that information is recorded on or reproduced from the magnetic disc and which comprises an index hole provided on the magnetic disc, wrong insertion detecting means for detecting whether the magnetic disc is inserted into the magnetic disc unit in a wrong direction or upside down via the index hole, and magnetic disc discharging means responsive to the output from the wrong insertion detecting means for discharging the magnetic disc from the magnetic disc unit.

Here, it is preferable that the wrong insertion detecting means comprises index detection means for detecting the index hole on the magnetic disc while the magnetic disc is rotated, ready detection means for detecting that the recording of information on the magnetic disc or the reproduction of information from the magnetic disc is ready when a predetermined number of indexes are detected during a predetermined time interval, and a time means for detecting the wrong insertion of the magnetic disc when the ready detection means does not detect that the inserted magnetic disc is not ready for recording or reproduction when a predetermined time duration has elapsed after the magnetic disc starts rotating.

Preferably, the wrong insertion detecting means comprises index detection means for detecting the index hole on the magnetic disc every time the magnetic disc makes one rotation, and time means for detecting the wrong insertion of the magnetic disc when the index detection means does not detect the index hole on the magnetic disc when a predetermined time duration required for detecting at least one index hole has elapsed after the magnetic disc starts rotating.

It is also preferable that the magnetic disc discharging means comprises a motor drive circuit, a motor which is driven by the motor drive circuit, and a roller member driven by the motor to transfer the magnetic disc inserted into the magnetic disc unit in such a way that the magnetic disc is discharged from the magnetic disc unit.

According to a third aspect of the present invention a magnetic disc unit into which a magnetic disc encased in a magnetic disc cassette is inserted in such a way that a predetermined surface of the magnetic disc encased in the magnetic disc cassette is upward and the sides of the magnetic disc are positioned in predetermined directions, so that information is recorded on or reproduced from the magnetic disc, and which comprises the magnetic disc cassette made of a light shielding material, an aperture formed through the magnetic disc cassette, a photosensor having a light emitting element and a light receiving element which are disposed opposite each other and for detecting the aperture in a manner that when the magnetic disc cassette is correctly inserted into the magnetic disc unit with the predetermined surface upward and with the sides positioned in the predetermined directions, the light emitted from the light emitting element is received by the light receiving element through the aperture of the magnetic disc cassette, wrong insertion detecting means for detecting the wrong insertion of the magnetic disc cassette when the photosensor does not detect the aperture, and magnetic disc cassette discharging means responsive to a wrong insertion signal derived from the wrong insertion detecting means for discharging the magnetic disc cassette from the magnetic disc unit.

Here, it is preferable that the aperture is provided so as to detect an index hole of the magnetic disc. The light emitting element of the photosensor may emit such a light as is received by the light reception element through the magnetic disc prior to the rotation of the magnetic disc, and the light emitting element may emit such a light as is received by the light receiving element only through the index hole of the magnetic disc after the magnetic disc starts rotating.

This light element may be composed of first and second sections which are separated from each other, the first section emitting light which is received by the light receiving element through the magnetic disc, and the second section emitting light which is received by the light receiving element only through the index hole of the magnetic disc.

It is also preferable that the magnetic disc cassette discharging means comprises a motor drive circuit, a motor which is driven by the motor drive circuit, and a roller member driven by the motor to transfer the magnetic disc cassette inserted into the magnetic disc unit in such a way that the magnetic disc cassette is discharged from the magnetic disc unit.

According to the present invention, an operator can immediately notice that he or she erroneously inserted a magnetic disc into a magnetic unit, so that he or she can correctly insert or load again the magnetic disc. Therefore, the recording or reproduction operation can be started promptly so that the operability of the magnetic disc unit in accordance with the present invention can be improved.

The above and other objects, effects and features of the present invention will become more apparent from the following description of preferred embodiments thereof taken in conjunction with the accompanying drawings, in which:

BRIEF DESCRIPTION OF THE DRAWINGS

FIG. 1 is a fragmentary longitudinal sectional view, on enlarged scale, showing a first embodiment of a magnetic disc unit according to the present invention;

FIG. 5 is a timing chart showing the relationship between an index signal and a ready signal;

FIG. 6 is a timing chart showing the relationship among various signals in the case of the correct insertion of a magnetic disc cassette;

FIG. 7 is a timing chart showing the relationship among various signals in the case of the wrong insertion;

DETAILED DESCRIPTION OF THE PREFERRED EMBODIMENTS

First Embodiment, FIGS. 1-7

Figure 2A:
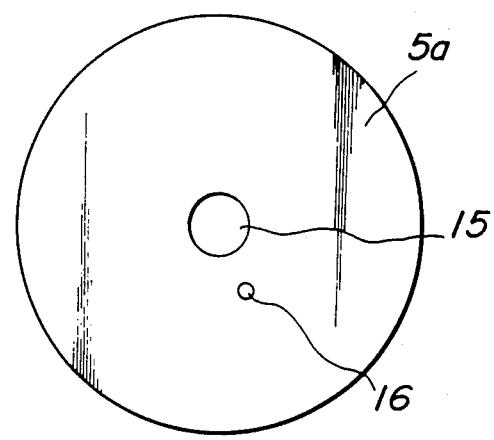
FIG. 2A is a top view showing an embodiment of a magnetic disc to be used in a magnetic disc unit according to the present invention.

Referring to FIGS. 1-7, a first embodiment of the present invention will be described. First referring to FIG. 1 showing a part of a magnetic disc unit with an automatic magnetic disc cassette loading or insertion mechanism in accordance with the present invention, reference numeral 1 denotes a frame. A front panel 2 is attached to the front end of the frame 1. A disc cassette insertion opening 4 is formed through the front panel 2 in such a way that the opening 4 is extended in the longitudinal or widthwise direction of the front panel 2 at the center thereof. The opening 4 may be a slit having a width slightly greater than the thickness of a magnetic disc cassette 5. When the magnetic disc cassette 5 is inserted and located at its operative position as shown in FIG. 1, the rear edge (the left-hand edge in FIG. 1) of the cassette 5 is not extended outwardly from the insertion slit 4.

A cover panel 6 is disposed to make a flat surface with the front panel 2. A drive roller 7 and a pinch roller 8 are disposed inside of the front panel 2. When the magnetic disc cassette 5 is clamped between the drive and pinch rollers 7 and 8, it is displaced rightward or leftward in FIG. 1, depending upon the direction of rotation of the drive roller 7. The drive roller 7 is coupled to the axis of a motor 40, which is shown by a broken line in FIG. 1 to be rotated by the motor 40.

A spindle 10 which is coupled to a motor 9 to be rotated thereby is located in an opposed relationship with the lower side of the center of the magnetic disc cassette 5 which is brought to the operative position or loading reference position. A center cone 11 is disposed in opposed relationship with the spindle 10 so that the magnetic disc cassette 5 is clamped between them at the operative position. The center cone 11 is rotatably borne at the free end of an arm 12 which is coupled to a drive mechanism (not shown) to be rotated thereby in such a way that the center cone 11 is moved toward or away from the magnetic disc cassette 5.

Figure 2B:
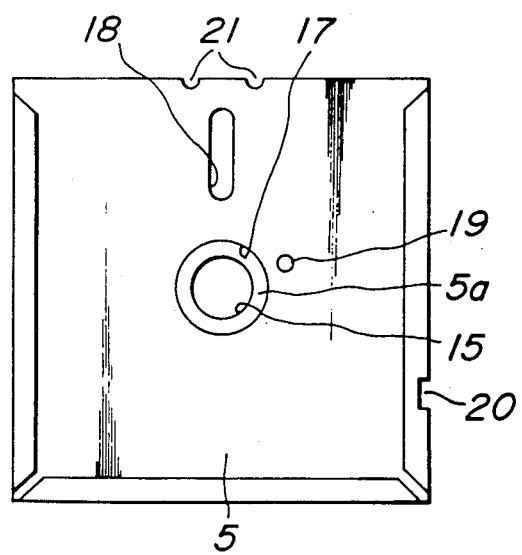
FIG. 2B is a top view showing a magnetic disc cassette to be used in a magnetic disc unit in accordance with the present invention.

FIGS. 2A and 2B show an example of a magnetic disc 5a and an example of a magnetic disc cassette 5 accommodating the magnetic disc 5a, respectively. The magnetic disc 5a comprises a disc-like thin Mylar sheet coated with magnetic powder and is formed with a center aperture 15 which is used to rotate the magnetic disc 5a in the case of recording or reproduction. An index hole 16 is formed in the vicinity of the center aperture 15. The magnetic disc 5a is encased within the magnetic disc cassette 5 (See FIG. 2B).

The disc cassette 5 may be in the form of a flat box having substantially a square form and made of black thick paper. A center aperture 17 is provided which is in a coaxial relationship with the center aperture 15 of the magnetic disc 5a encased within the cassette 5. The magnetic disc cassette 5 is further formed with an elongated opening or head window 18 through which a magnetic head is extended so as to make contact with the magnetic disc 5a in the case of the recording or reproduction.

An index hole 19 is formed in the vicinity of the center aperture 15 for alignment with the index hole 16 of the magnetic disc 5a. That is, the distance between the center of the center aperture 15 and the center of the index hole 16 of the magnetic disk 5a is equal to the distance between the center of the center hole 17 and the center of the index hole 19 of the magnetic disc cassette 5. Therefore, the center of the index hole 19 coincides with the circular path of the center of the index hole 16 of the magnetic disc 5a. As a result, whenever the magnetic disc 5a makes one rotation in the case of the recording or reproduction, the index hole 16 coincides or is made in alignment with the index hole 19 of the magnetic disc cassette 5. A write protect notch 20 is formed on one side end of the magnetic disk cassette 5. Relief notches 21 are formed on the side end on the side of the head window 18.

Figure 3:
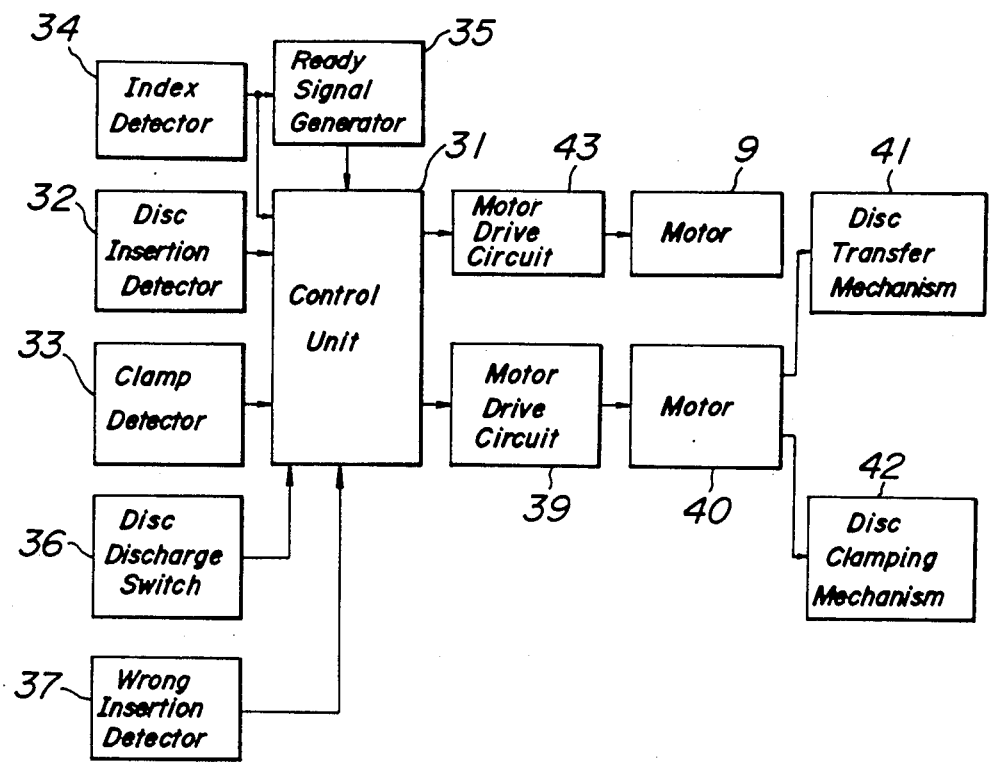
FIG. 3 is a block diagram showing an embodiment of an electrical circuit in the first embodiment.

FIG. 3 shows a block diagram of an embodiment of an electrical circuit portion of a magnetic disc unit of the first embodiment. A control unit 31 which controls all the operations of the magnetic disc unit in accordance with the present invention may be formed by a central processor. The outputs of a disc insertion detector 32, a clamp detector 33 and an index detector 34 are connected to the inputs of the control unit 31. The output of a ready signal generator 35 is connected to the input of the control unit 31. Moreover, the outputs of a disc discharge switch 36 and a timer circuit as a wrong insertion detector 37 are connected to the input of the control unit 31.

One output of the control unit 31 is connected to a motor drive circuit 39 which may be formed by a conventional power amplifier. The output of the motor drive circuit 39 is connected to a motor 40 as a driving source for the displacement and clamp of the magnetic disc 5a. The motor 40 is connected, therefore, to a disc transfer mechanism 41 and a disc clamping mechanism 42.

Another output of the control unit 31 is connected to another or second motor drive circuit 43 which may comprise a conventional power amplifier and which in turn is connected to another or second motor 9 for rotating the loaded disc clockwise or counterclockwise.

In response to the input signals, the control unit 31 controls all operations of the magnetic disc unit in accordance with the present invention. That is, the control unit 31 controls the first motor 40 via the first motor drive circuit 39, so that the first motor 40 is coupled to the disc transfer mechanism 41 or the disc clamping mechanism 42 which in turn displaces the magnetic disc 5a, i.e., inserts the magnetic disc 5a into the magnetic disc unit or discharges the magnetic disc 5a from the magnetic disc unit, or clamps the magnetic disc unit 5a. The control unit 31 also controls the second motor drive circuit 43 which in turn drives the second motor 9 so that the inserted magnetic disc 5a is rotated in the clockwise or counterclockwise direction.

Figure 4:
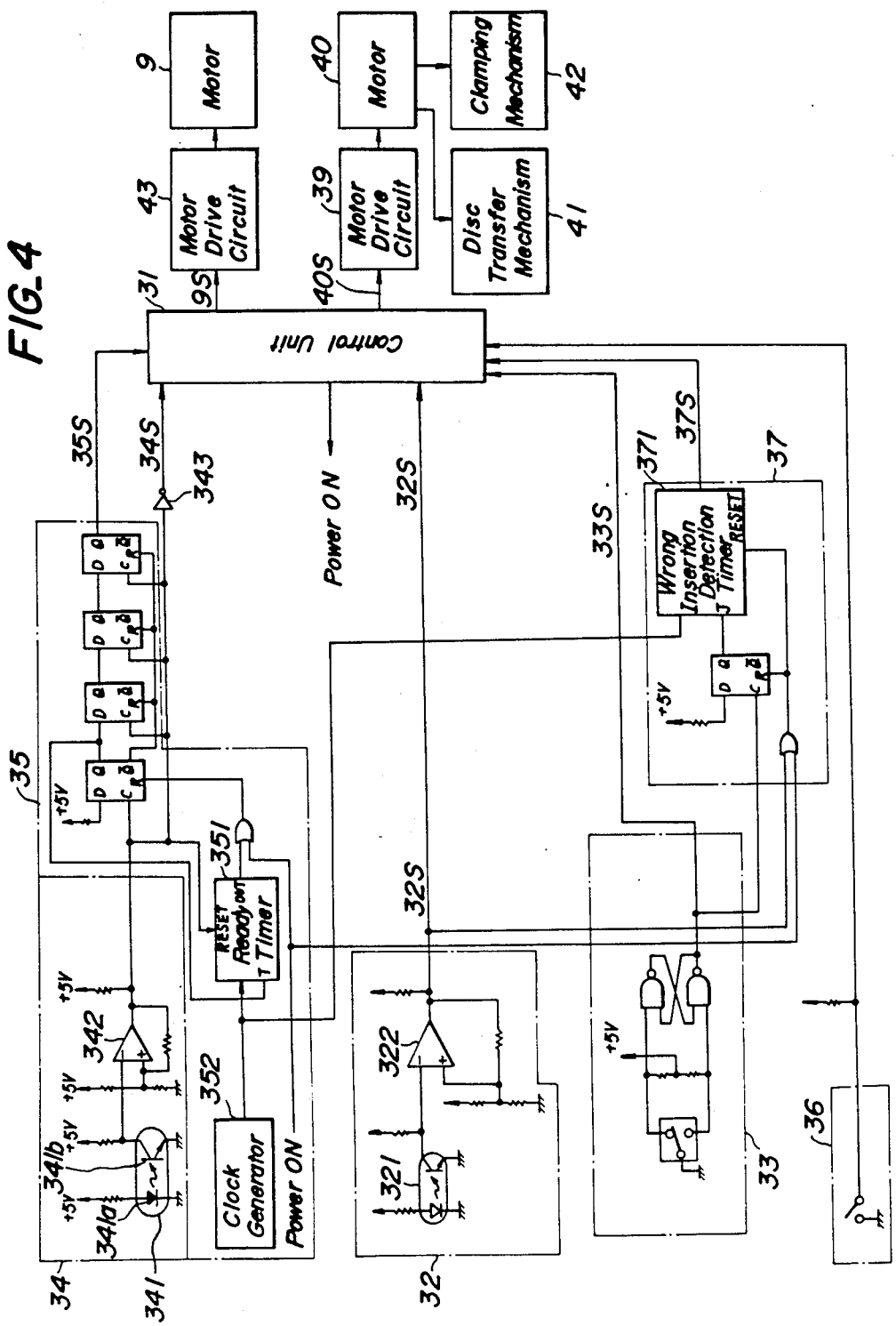
FIG. 4 is a circuit diagram showing details of the blocks shown in FIG. 3.

FIG. 4 shows in detail the circuits connected to the control unit 31 shown in FIG. 3.

When the magnetic disc cassette 5 is inserted into the magnetic disc unit, the disc insertion detector 32 detects the insertion of the magnetic disc cassette 5 to generate an output or disc load signal 32s which in turn is applied to the control unit 31. The disc insertion detector 32 comprises a photosensor 321 for detecting the insertion of the magnetic disc cassette 5 and a comparator 322. The output of the photosensor 321 is connected to the input terminal (−) of the comparator 322. When the magnetic disc cassette 5 is inserted into the magnetic disc unit, the output potential of the photosensor 321 becomes a high level, so that the comparator 322 generates a disc load signal 32S of a low level which in turn is applied to the control unit 31.

When the magnetic disc cassette 5 is clamped completely, the clamp detector 33 generates a clamp signal 33S of a low level which in turn is applied to the control unit 31.

In the case of the recording or reproduction, the index detector 34 detects whether the magnetic disc cassette 5 is indexed or not. The index detector 34 comprises a photosensor 341 which may consist of a photodiode 341a and a phototransistor or photoelectric transducer 341b. The photodiode 341a may be, for example, SLP-114A (a product of Sanyo Electric Co., Ltd.) and the photoelectric transducer 341b may be, for example, SPS-103 (a product of Sanyo Electric Co., Ltd.). The collector of the phototransitor 341b is connected to the input terminal (−) of a comparator 342 which may be, for example, KC393-P (a product of Nippon Electric Co., Ltd.). The output of the comparator 342 is applied to the ready signal generator 35 and to a NOT gate 343. The output from the NOT gate 343 is applied as an index signal 34S to the control unit 31.

The ready signal generator 35 generates a ready signal 35S, which rises in synchronism with the rise of the fourth pulse of the index signal 34s, and applies the ready signal to the control unit 31. To this end, the ready signal generator 35 is comprised of four D flip-flops connected in series. The D flip-flops may be, for example, 74LS74 (a product of Texas Instruments). The ready signal generator 35 further comprises a ready timer 351 which may be, for example, HA17555 (a product of Hitachi Ltd.) The ready timer 351 is provided for detecting a delayed index pulse as indicated by reference A in FIG. 5. The ready timer 351 counts clocks from a clock generator 352 to generate the ready signal of a high level when the index pulses 34S are generated at a correct timing.

If the rate of rotation of the second motor 9 is decreased, so that the delayed pulse A (See FIG. 5) is generated, the ready signal 35S drops to a low level in response to the output from the ready timer 351, as shown in FIG. 5.

A disc discharge switch 36 is provided in order to instruct the discharge of the magnetic disc cassette 5 from the magnetic disc unit after the recording or reproduction. The disc discharge switch 36 is normally opened (OFF) as shown in FIG. 4 and is closed (ON) when the magnetic disc cassette 5 is discharged from the magnetic disc unit after the recording or reproduction.

A wrong insertion timer detector 37 generates a wrong insertion detection timer signal 37S which defines a time duration during which the detector 3 judges whether the magnetic disc cassette 5 is erroneously inserted into the magnetic disc unit or not. That is, when the clamp signal 33S from the clamp detector 33 is applied to the C terminal of a D flip-flop in the detector 37, a wrong insertion detection timer 371 starts counting clocks in response to the output from the Q output terminal of the D flip-flop. Simultaneous with the starting of counting clocks, the signal 37S becomes a high level and remains at a high level until the timer 371 counts a predetermined number of clocks. Thereafter, the signal 37S becomes a low level. When the signal 37S falls, it is detected whether or not the magnetic disc cassette 5 is inserted erroneously. The wrong insertion detection timer 371 may be, for example, HA17555 (a product of Hitachi Ltd.).

FIG. 5 shows the timing relationship between the index signal 34S and the ready signal 35S.

FIG. 6 shows the timing relationship among various signals in the case of the correct insertion of the magnetic disc cassette 5. Reference numeral 33S denotes the signal representative of the completion of clamping the magnetic disc; 9S, a motor drive signal; 40S, a signal representative of the direction (clockwise or counterclockwise) of the first motor 40; and 37S, the wrong insertion detection timer signal.

FIG. 7 shows the timing relationship among various signals in the case of the wrong insertion of the magnetic disc cassette 5.

Next, the operations of the first embodiment with the above described construction will be described.

The disc insertion detector 32 detects the insertion of the magnetic disc cassette 5 through the insertion slit 4 and in response to the detection output (that is, the disc load signal 32S), the drive roller 7 is rotated. When the magnetic disc cassette 5 is brought to its operative position by the drive roller 7, a detection means comprising a photosensor and other components detects that the magnetic disc cassette 5 has been placed in its operative position. Then, in response to the output from this detection means, the drive roller 7 is stopped. At the same time, the arm 12 is lowered, so that the magnetic disc cassette 5 is clamped between the spindle 10 and the center cone 11.

When the clamp is completed, the clamp detector 33 generates the clamp completion signal 33S which in turn is applied to the control unit 31. In response to this signal 33S, the control unit 31 generates the drive signal 9S for driving the second motor 9 and the motor rotation signal 40S. These signals 9S and 40S in turn are applied to the second motor drive circuit 43 and the first motor drive circuit 39, respectively.

More particularly, when the magnetic disc cassette 5 is completely clamped, the wrong insertion detection timer signal 37S becomes a high level in synchronism with the rise of the clamp completion signal 33S. Furthermore, the motor drive signal 9S becomes a low level, so that the magnetic disc 5a starts rotating.

In the case of the correct insertion of the magnetic disc cassette 5, if the magnetic disc 5a rotates, the photosensor 341 detects the index hole 16, so that the index pulse signals 34S are generated. The wrong insertion detection timer signal 37S becomes a high level in synchronism with the rise of the clamp signal 33S and then becomes a low level after a predetermined time interval.

When the wrong insertion detection timer signal 37S remains at a high level, the ready signal 35S becomes a high level in response to the rise of the fourth pulse of the index signal 34S. In FIGS. 6 and 7, the signal 40S is at a high level when the motor 40 is rotated in the counterclockwise direction, and is at a low level when the motor 40 is rotated in the clockwise direction. The hatched period in FIGS. 6 and 7 shows that the motor 40 is stopped.

Referring particularly to FIG. 7, in the case of the wrong insertion of the magnetic disc cassette 5, the photosensor 341 is not in alignment with the index hole 16, so that the obtained index signal 34S does not have a pulse signal. As a result, the ready signal 35S also does not become a high level. Therefore, it follows that when the wrong insertion detection timer signal 37S becomes a low level, the ready signal 35S remains at a low level, so that it is judged that the magnetic disc cassette 5 is erroneously inserted. That is, the wrong insertion of the magnetic disc cassette 5 is detected. In this case, the drive signal 9S for driving the motor 9 is a high level, while the rotation signal 40S is a low level. As a result, the drive roller 7 is rotated in the clockwise direction, so that the erroneously inserted magnetic disc cassette 5 is automatically discharged from the magnetic disc unit through the insertion slit 4.

As described above, in the case of the wrong insertion, the magnetic disc cassette 5 is automatically discharged from the magnetic disc unit, so that it is not necessary that an operator always pays attention to a correct insertion of the magnetic disc cassette into the magnetic disc unit. Furthermore, when the magnetic disc unit in accordance with the present invention is incorporated into a large system, it is not necessary to display a particular sign or picture sign of a correct insertion direction of a magnetic disc cassette on the side of the system.

In the first embodiment, the period during which the wrong insertion detection timer signal is a high level is determined such that more than three index pulses are generated during the period so as to permit the rise of the ready signal, and in response to the state of the ready signal, it is indirectly detected whether the index pulse is generated or not, so that the wrong insertion of a magnetic disc cassette may be detected. Alternatively, it should be noted that the index pulse may directly be detected. That is, a time period is set during which at least one index pulse is generated after a magnetic disc is rotated by the second motor 9, so that when no index pulse is detected during this time period, it is judged that the wrong insertion has occurred.

While in the first embodiment, in order to detect the wrong insertion of a magnetic disc cassette, an electrical signal, that is, the wrong insertion detection timer signal is used, it is to be understood that a mechanical detection signal may be used. That is, after a magnetic disc cassette has been brought to its operative position, the second motor 9 is driven to rotate the magnetic disc. When a few index pulses are generated and counted, the clamp signal becomes a high level. When such a mechanical sequence as described above is employed, the wrong insertion of a magnetic disc cassette can be detected in response to the index signal, the clamp signal and the motor drive signal, so that the timer for detecting the wrong insertion of a magnetic disc cassette may be eliminated.

In addition, while in the first embodiment, the ready signal which is generated in the magnetic disc unit is used to detect the wrong insertion, it is to be understood that the wrong insertion can be detected in response to the index signal.

Figure 8:
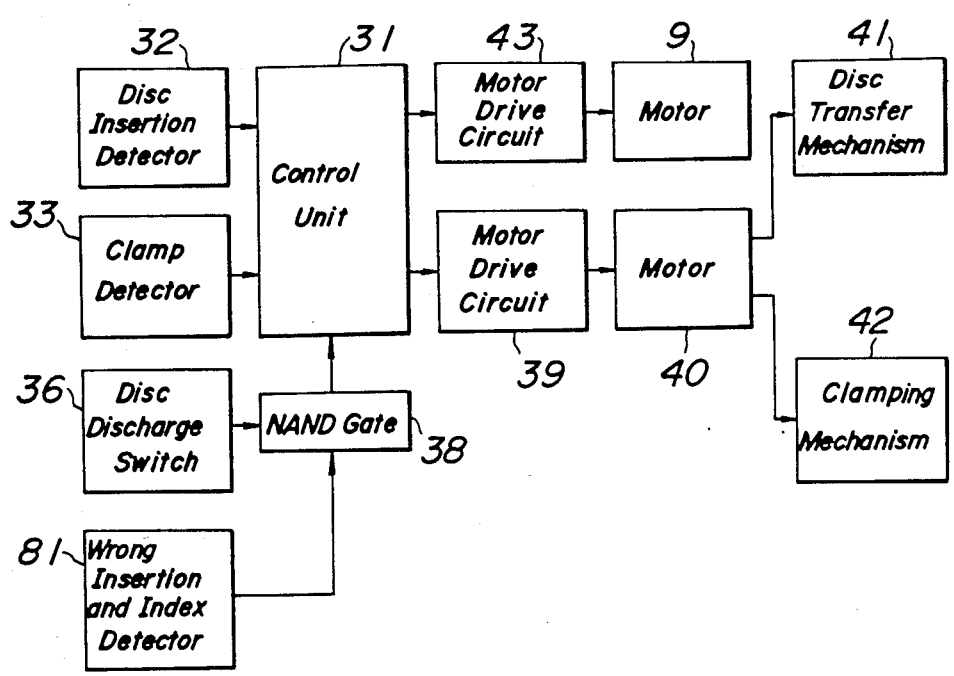
FIG. 8 is a block diagram showing a second embodiment of a magnetic disc unit according to the present invention.
Figure 9:
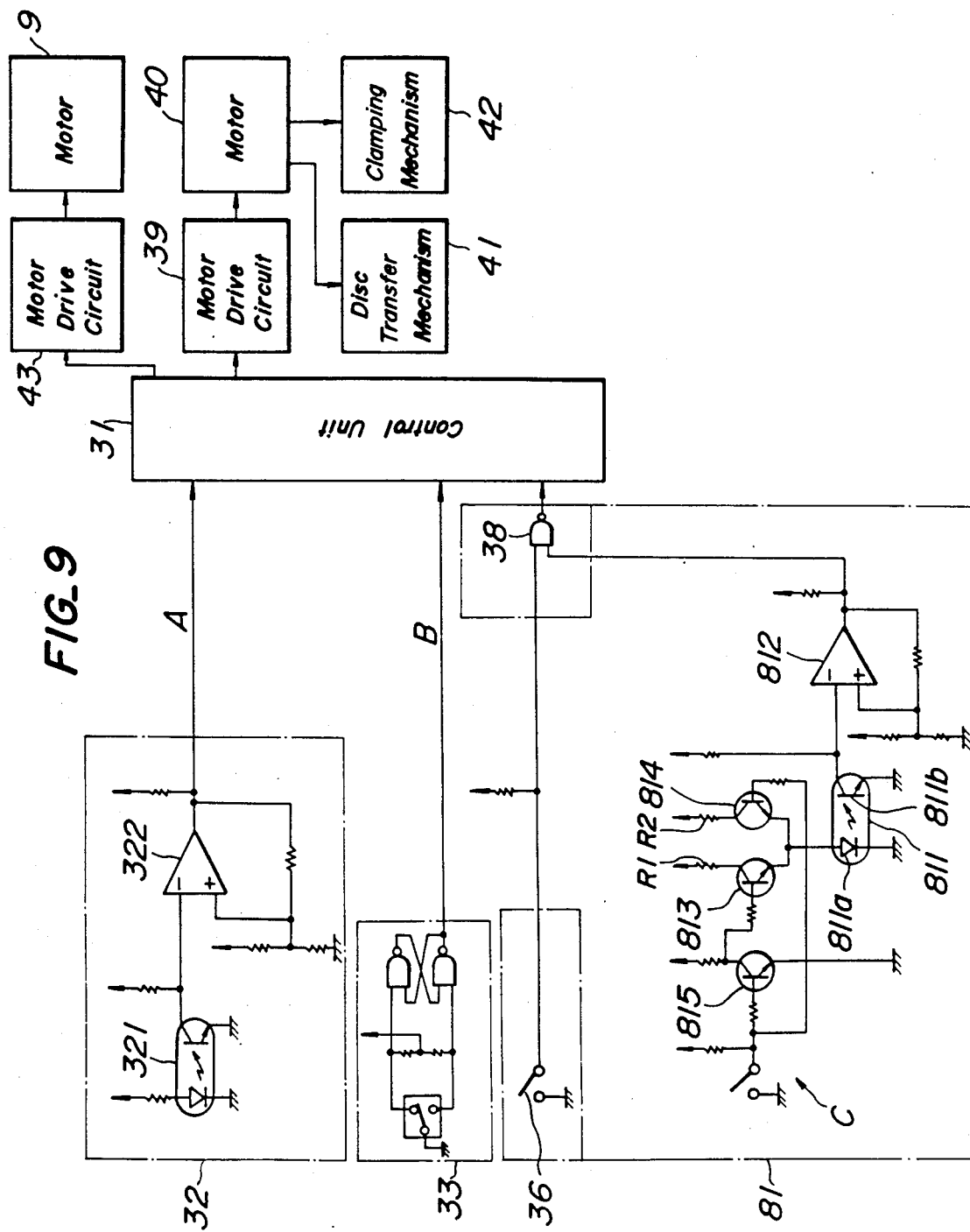
FIG. 9 is a circuit diagram showing details of the blocks shown in FIG. 8.
Figure 10:
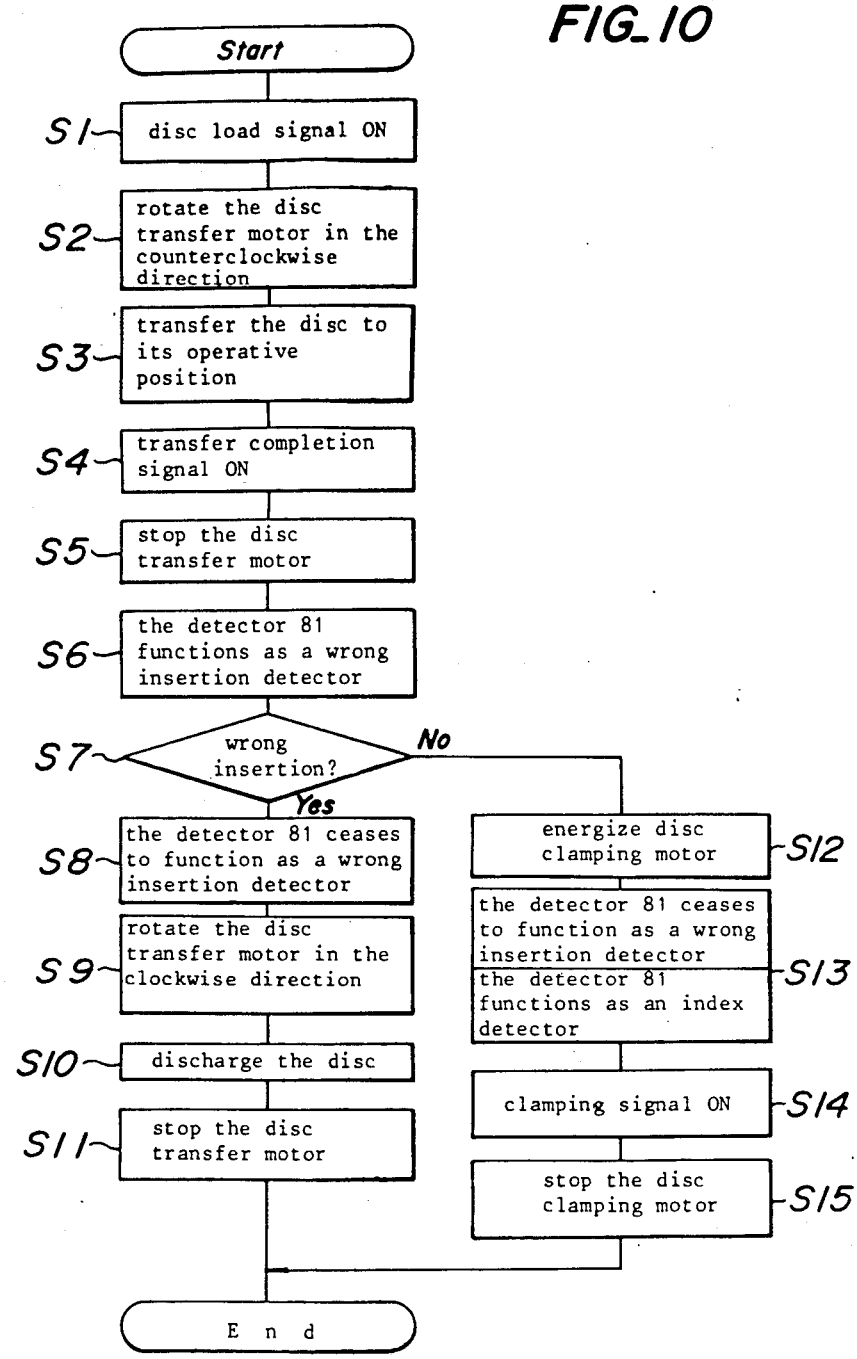
FIG. 10 is a flow chart showing an example of the sequence of controlling operations performed by a control unit as shown in FIG. 8 or 9.

Second Embodiment, FIGS. 8-10

FIG. 8 shows a block diagram of a second embodiment of the present invention in which the wrong insertion of a magnetic disc cassette can be detected in response to the index signal.

As in the case of the first embodiment, the control unit 31 controls all the operations of the magnetic disc unit in accordance with the present invention. The outputs of the disc insertion detector 32 and the clamp detector 33 are connected to the input of the control unit 31. The outputs from the disc discharge switch 36 and a wrong insertion and index detector 81 are applied to the NAND gate 38 which may be, for example, 74LS001 (a product of Texas Instruments). The output from the NAND gate 38 is applied to the control unit 31. One output of the control unit 31 is connected to the input of the first motor drive circuit 39 which in turn is connected to the first motor 40. The motor 40 is connected to the disc transfer mechanism 41 and the clamping mechanism 42.

In response to the outputs from the disc insertion detector 32, the clamp detector 33, the disc discharge switch 36 and the wrong insertion and index detector 81, the control unit 31 controls all the operations of the magnetic disc unit. That is, the control unit 31 controls the first motor 40 through the first motor drive circuit 39 in such a way that the motor 40 is selectively coupled to the disc transfer mechanism 41 or the clamping mechanism 42. As a result, the magnetic disc cassette is inserted into or discharged from the magnetic disc unit and the magnetic disc is clamped in a manner substantially described above in conjunction with the first embodiment.

FIG. 9 shows in detail the circuits connected to the input sides of the control unit 31 shown in FIG. 8.

The wrong insertion and index detector 81 is used not only for detecting the wrong insertion of a magnetic disc cassette but also for detecting the index hole in the case of the recording or reproduction. The detector 81 comprises a photosensor 811 which consists of a photodiode 811a as a light emitting device and a phototransistor 811b as a light receiving device. The photodiode 811a may be, for example, SLP-114A (a product of Sanyo Electric Co., Ltd.) and the phototransistor 811b may be, for example, SPS-103 (a product of Sanyo Electric Co., Ltd.). The collector of the phototransistor 811b is connected to the input terminal (−) of a comparator 812 which may be, for example, KC393-P (a product of Nippon Electric Co., Ltd.).

The output of the comparator 812 is connected to one input terminal of the NAND gate 38. The emitters of two transistors 813 and 814, which are connected in parallel with each other, are connected commonly to the anode of the photodiode 811a of the photosensor 811. The collectors of the transistors 813 and 814 are connected through resistors R1 and R2, respectively, to a power supply (not shown). It should be noted that the value of the resistor R1 is smaller than that of the resistor R2.

The base of the transistor 813 is coupled to the collector of a switching transistor 815, while the base of the transistor 814 is coupled to the base of the switching transistor 815. When the magnetic disc cassette 5 is placed in its operative position and clamped, the control unit 31 applies a transfer completion signal C to the base of the switching transistor 815.

When the signal C is turned on, the switching transistor 815 is turned off, so that the transistor 813 is turned on, while the transistor 814 is turned off. Since the value of the current limiting resistor R1 is smaller than that of the current limiting resistor R2 as described above, a relatively high current flows through the photodiode 811a and consequently the photodiode 811a emits light of a relatively high intensity.

On the other hand, when the signal C is turned off, the switching transistor 815 is turned on. As a result, the transistor 813 is turned off, while the transistor 814 is turned on. As described above, since the value of the current limiting resistor R2 is higher than that of the current limiting resistor R1, a relatively small current flows through the photodiode 811a, so that the photodiode 811a emits light of a relatively low intensity.

When the magnetic disc cassette 5 has been correctly inserted and brought to its operative position and clamped, the magnetic disc 5a is inserted between the photodiode 811a and the phototransistor 811b which are opposite to each other in such a way that the photodiode 811a and the phototransistor 811b are aligned with the index hole 19 of the magnetic disc cassette 5.

In the case of the correct insertion of the magnetic disc cassette 5, the photodiode 811a emits light of a high intensity, that is, when the signal C is turned on, so that the light emitted from the photodiode 811a passes through the disc 5a via the index hole 19 and is received by the phototransistor 811b. As a result, the phototransistor 811b is turned on, so that the output voltage from the comparator 812 rises to a high level and is applied to the NAND gate 38.

On the other hand, in the case of the wrong insertion, the light emitted from the photodiode 811a is interrupted by the magnetic disc cassette 5 and accordingly is not received by the phototransitor 811b. As a result, the phototransistor 811b is not turned on, so that the output voltage from the comparator 812 is a low level.

As described above, the disc discharge switch 36 normally applies a high level voltage to the other input terminal of the NAND gate 38. Consequently, depending upon whether the output from the comparator 812 is at a high level or a low level, the output of the NAND gate 38 is at a low level or at a high level, so that the control unit 31 judges whether the magnetic disc cassette 5 has been correctly inserted or not in accordance with the output from the NAND gate 38.

As described above, when the transfer completion signal C is turned on, the wrong insertion and index detector 81 detects the wrong insertion. More particularly, when the wrong insertion of the magnetic disc cassette 5 is detected by the detector 81, the output from the comparator 812; that is, the input to the one input terminal of the NAND gate 38 drops to a low level. The input to the other input terminal of the NAND gate 38 remains at a high level, as described above, so that the output from the NAND gate 38 remains at a high level. In response to the high level output from the NAND gate 38, the control unit 31 discharges the magnetic disc cassette 5 which has been erroneously inserted.

On the other hand, when the signal C is turned off, so that the photodiode 811a emits light of a relatively low intensity, the wrong insertion and index detector 81 detects the index hole. That is, when the light emitted from the photodiode 811a has a low intensity, the light hardly passes through the magnetic disc 5a. As a result, only when the index hole 16 of the magnetic disc 5a (See FIG. 2A) coincides with the index hole 19 of the magnetic disc cassette 5 (See FIG. 2B) while the magnetic disc 5a rotates in the case of the recording or reproduction, the light emitted from the photodiode 811a is received by the phototransistor 811b.

When the phototransistor 811b receives the light emitted from the photodiode 811a, the phototransistor 811b is turned on, so that the output voltage of the comparator 812 rises to a high level. On the other hand, when the phototransistor 811b does not receive light, it is turned off, so that the output voltage of the comparator 812 remains at a low level. As described above, the disc discharge switch 36 normally applies a high level signal to the other input terminal of the NAND gate 38. As a result, the output voltage from the NAND gate 38 remains at a low level when the index is detected, while the output voltage rises to a high level when the index is not detected. The index signal is detected in the manner described above.

Referring next to FIG. 10, the operations of automatically loading a magnetic disc cassette and the operations of automatically detecting the wrong insertion of the magnetic disc cassette will be described in detail. FIG. 10 shows a flow chart of one example of a sequence of controlling steps in the control unit 31.

First, the insertion of a magnetic disc cassette 5 is detected by the disc insertion detector 32, so that the disc load signal 32S is turned on (Step S1). In response to the rise of the signal 32S, the control unit 31 controls the first drive circuit 39 in such a way that the motor 40 is drivingly coupled to the disc transfer mechanism 41 and is driven in the counterclockwise direction (Step S2). As the disc transfer mechanism 41 is energized, the magnetic disc cassette 5 is withdrawn into the magnetic disc unit (Step S3).

When the magnetic disc cassette 5 is brought to its operative position, the control unit 31 turns on the transfer completion signal C (Step S4). The control unit 31 then controls the motor drive circuit 39 in a manner that the motor 40 is stopped (Step S5). As a result, the magnetic disc cassette 5 is stopped at its operative position.

Since the signal C is turned on, the transistor 813 is turned on, so that a relatively high current flows through the photodiode 811a and thus the photodiode 811a emits a relatively high intensity light. As a result, the wrong insertion and index detector 81 functions as a wrong insertion detector (Step S6).

Thereafter, the control unit 31 detects the wrong insertion depending upon whether the output voltage from the NAND gate 38 is at a high level or at a low level (Step S7).

In the case of the high level output voltage; that is, in case of the wrong insertion, the signal C is turned off, so that the wrong insertion and index detector 81 is switched to cease to function as the wrong insertion detector (Step S8).

Thereafter, the motor 40 which is coupled to the disc transfer mechanism 41 is rotated in the clockwise direction (Step S9). As a result, the magnetic disc cassette 5 is discharged (Step S10). When the magnetic disc cassette 5 is discharged to a predetermined position, the control unit 31 stops the motor 40 via the motor drive circuit 39 (Step S11).

When the discharged magnetic disc cassette 5 is turned upside down and is correctly inserted into the magnetic disc unit, the steps S1 through S7 are repeated.

When the magnetic disc cassette 5 is correctly inserted, the output from the NAND gate 38 drops to a low level in Step S7. Therefore, the control unit 31 disconnects the motor 40 from the magnetic disc transfer mechanism 41 and connects the motor 40 to the clamping mechanism 42 (Step S12).

Next, as in the case of Step S8, the signal C is turned off, so that the wrong insertion and index detector 8 is switched to cease to function as the wrong insertion detector. That is, the wrong insertion and index detector 81 functions as an index detector (Step S13).

Thereafter, the clamping mechanism 42 clamps the magnetic disc 5a, so that the clamping signal 32S is turned on (Step S14). In response to the clamping signal 32S, the motor 40 is stopped; that is, the clamping operation is completed (Step S15).

Further, while in the second embodiment, the wrong insertion and index detector 81 has only one photodiode 811a, it is to be understood that two photodiodes may be used through which two different currents flow respectively.

What is claimed is:

1. A data storage disc unit into which a disc, provided with a first aperture and encased in a disc cassette made of a light shielding material having a second aperture therein, is inserted into an operative position with a predetermined surface of said disc facing upward and the sides of said disc positioned in predetermined directions, said disc unit comprising:

a photosensor having a light emitting element and a light receiving element disposed on opposite sides of said disc cassette;

means for clamping said disc cassette;

means for generating a transfer completion signal when said disc cassette is inserted into said disc unit to its operative position, prior to clamping of said disc cassette;

means for varying the intensity of light emitted from said light emitting element in such a way that said light emitting element emits light of a relatively high intensity when said transfer completion signal is generated and said light emitting element emits light of a relatively low intensity after said disc cassette has been clamped;

means for detecting insertion of said disc cassette when said light of a relatively high intensity is emitted by said light emitting element and is transmitted through said second aperture in said disc cassette to determine that said disc cassette is correctly inserted into said disc unit with said predetermined surface upward and with said sides positioned in said direction;

wrong insertion detecting means for detecting the wrong insertion of said magnetic disc cassette when said photosensor does not detect said high intensity light pulses being transmitted through said first aperture prior to clamping of said disk cassette;

means for generating an index signal in response to an output from said light receiving element when said light of a relatively low intensity is emitted by said light emitting element and is transmitted through said first and second apertures in said disc and said disc cassette after clamping of said disc cassette; and disc cassette discharging means responsive to a wrong insertion signal derived from said wrong insertion detecting means for discharging said disc cassette from said disc unit.

2. A data storage disc unit as claimed in claim 1, wherein said first aperture is an index hole in said disc, light emitted from said light emitting element is not transmitted through said index hole prior to the clamping of said disc, and light emitted from said light emitting element is periodically received by said light receiving element through said index hole and said second aperture after said disc is clamped.

3. A data storage disc unit as claimed in claim 1, wherein said disc cassette discharging means comprises:
a motor drive circuit;
a motor driven by said motor drive circuit; and
a roller member driven by said motor to transfer the disc cassette inserted into said disc unit in a direction such as to discharge said disc cassette from said disc unit.

4. A data storage disc unit as claimed in claim 1, wherein said disc is a magnetic disc.

5. A data storage disc unit as claimed in claim 2, wherein said disc is a magnetic disc.

6. A data storage disc unit as claimed in claim 3, wherein said disc is a magnetic disc.

* * * * *